United States Patent [19]

Blanchard et al.

[11] 4,404,878
[45] Sep. 20, 1983

[54] BAR STOCK FEED APPARATUS

[76] Inventors: Vernon F. Blanchard, 35406 Brookview; Bradley V. Blanchard, 14417 Park, both of Livonia, Mich. 48152

[21] Appl. No.: 247,576

[22] Filed: Mar. 26, 1981

[51] Int. Cl.³ .............................................. B23B 15/00
[52] U.S. Cl. ......................................... 82/2.5; 414/14; 414/17
[58] Field of Search ..................... 82/38 R, 38 A, 2.5, 82/2.7; 29/57; 414/15, 17, 18, 20, 14

[56] References Cited

U.S. PATENT DOCUMENTS

| 477,513 | 6/1892 | Conradson | 414/14 |
|---|---|---|---|
| 489,935 | 1/1893 | Conradson | 414/14 |
| 932,394 | 8/1909 | Johnson | 414/14 |
| 1,021,771 | 4/1912 | Greenleaf | 414/14 |
| 1,184,614 | 5/1916 | Brightman | 82/38 R |
| 1,755,265 | 4/1930 | Mueller | 82/38 R |
| 3,228,271 | 1/1966 | Fluskey | 82/38 R |
| 3,606,807 | 9/1971 | Rast | 82/38 R |
| 3,691,879 | 8/1972 | Blake | 414/14 |
| 3,703,112 | 11/1972 | Selby | 414/14 |
| 4,321,845 | 3/1982 | Szabo et al. | 82/2.5 |

*Primary Examiner*—Leonidas Vlachos
*Assistant Examiner*—Jerry Kearns
*Attorney, Agent, or Firm*—Krass, Young & Schivley

[57] ABSTRACT

Apparatus for feeding bar stock through the chuck of an automatic lathe. The apparatus is moved laterally by the turret to form shallow notches in the surface of the bar stock. The notches in the bar stock are gripped during longitudinal movement of the turret to advance the bar stock into the work area. A pair of cutting elements are adjustably located on one end of the apparatus to grip bar stock of various diameters. Guide blocks having interchangeable bushings to accommodate bar stock of different diameters are also disclosed for supporting the bar stock for rotation by the chuck.

19 Claims, 8 Drawing Figures

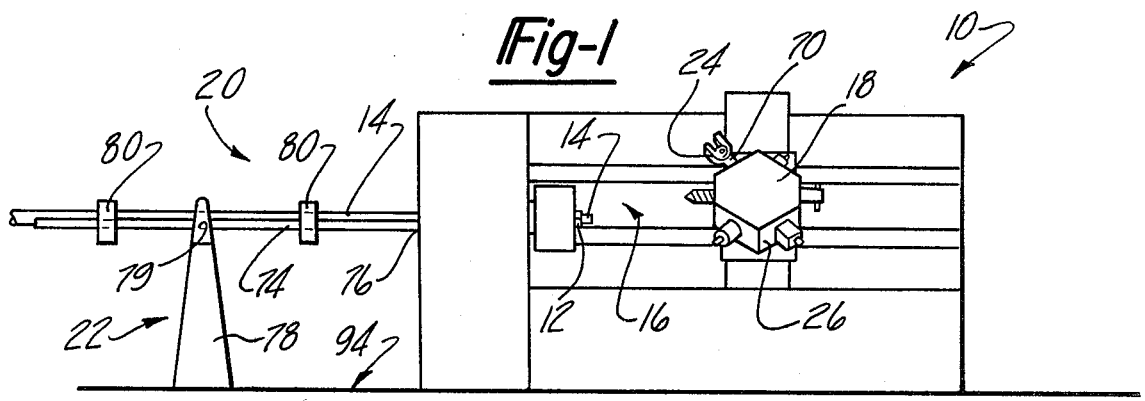
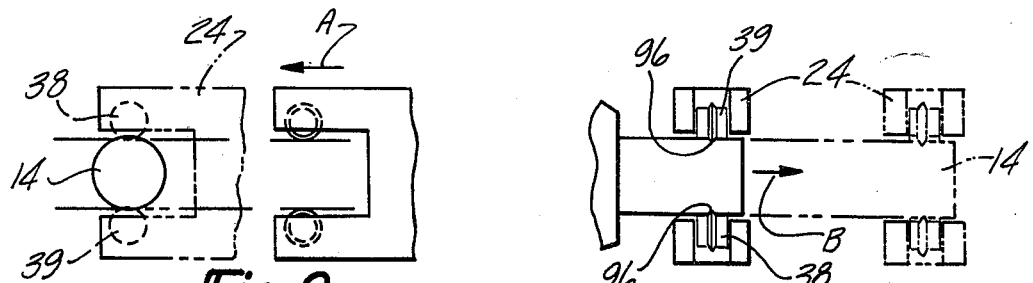
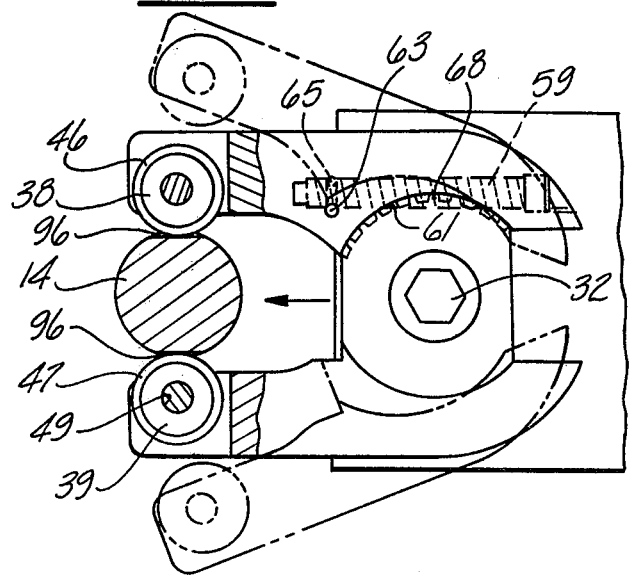
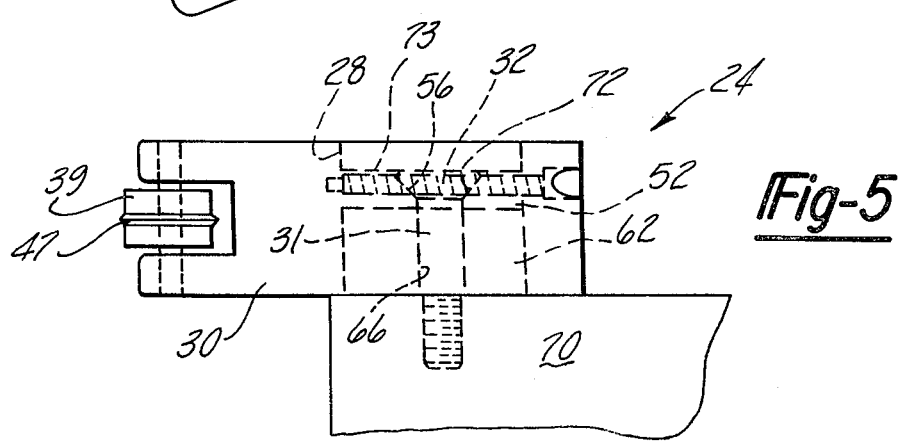

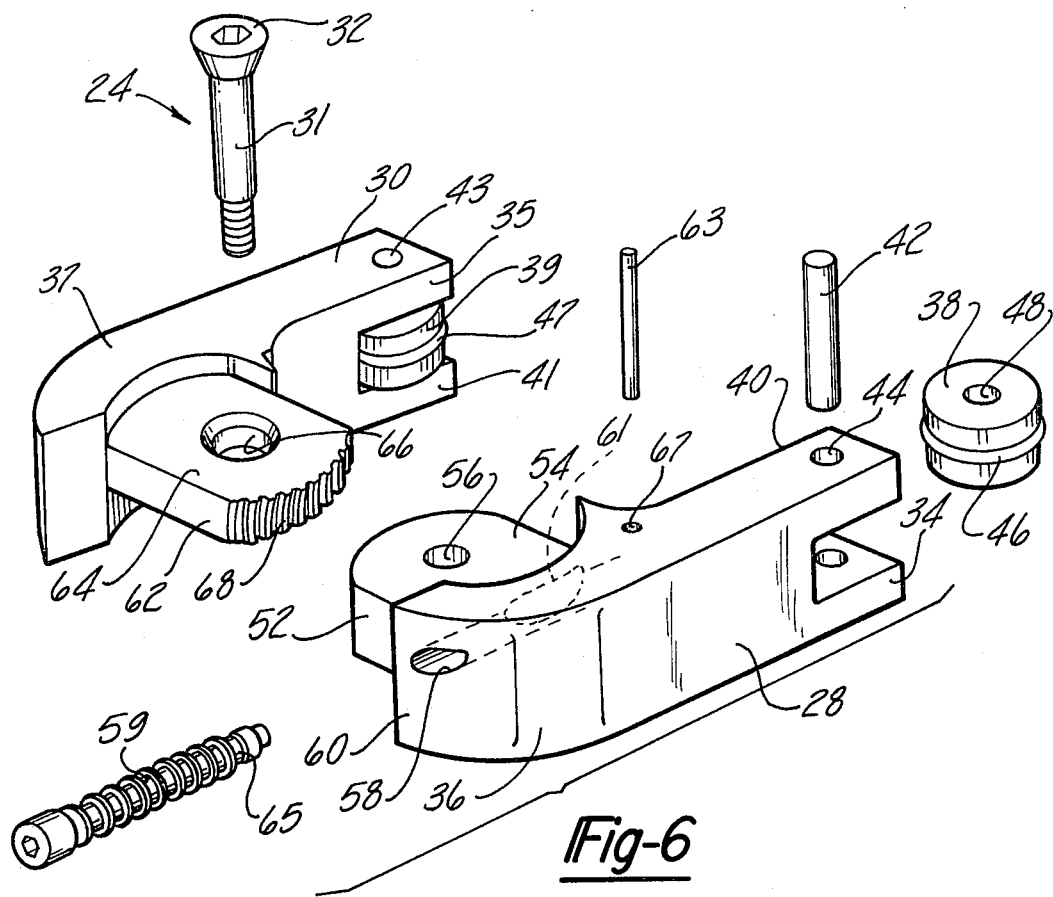
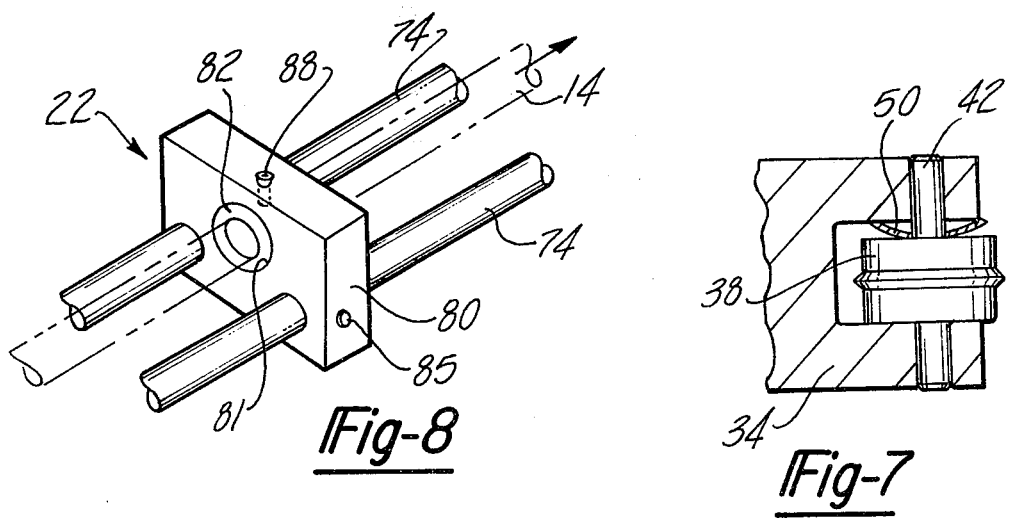

BAR STOCK FEED APPARATUS

TECHNICAL FIELD

This invention relates generally to lathes and more particularly to work piece feeding apparatus for automatic lathes in which bar stock is fed through the lathe chuck.

Background Art

It is well known to use automatic feed mechanisms to feed bar stock to be machined in automatic lathes. These mechanisms are usually separate units attached to the feed end of the lathe. The feed units typically include bar stock guides and a power drive mechanism for the stock. This type of feed unit is expensive and requires substantial control interfacing with the lathe. The bar stock is fed into the work area of the lathe by the feed unit until it contacts a stop block mounted on the tool changing turret. If the stop block is not properly positioned to stop the advancing bar stock, because of operator error or machine malfunction, the feed unit may propel the bar stock through the lathe, endangering the operator and adjacent property.

U.S. Pat. No. 3,664,215 to Selby, issued May 23, 1972 discloses an internal bar stock feed device mounted on and controlled by the numerically controlled tool changing turret of a single spindle automatic lathe. In numerically controlled automatic single spindle lathes the tool changing turret is operative to move along two or more axes according to programmed instructions of a control unit. Selby discloses a bar stock feed apparatus which is mounted on the turret to engage one end of the bar stock by means of a collet type gripping device. The collet moves over the end of the stock to circumferentially engage it with resilient fingers by means of frictional pressure applied to the surface of the bar stock and then moves with the turret to advance the bar stock into the work area for machining operations. If the surface of the bar stock is oily the collet may slip while feeding the bar stock. Similarly, if the gripping fingers become worn or lose their resiliency the collet may slip on the bar stock. This slippage will in turn cause unwanted variation in the length of bar stock fed into the work area.

In addition, a significant length of longitudinal turret travel is required by the collet type gripping device disclosed by Selby to engage the end of the bar stock. In small automatic lathes the additional amount of longitudinal turret travel required may not be available to provide sufficient clearance to grip the end of the bar stock.

The length of bar stock extending from the chuck into the work area must be equal to the length of the piece being machined plus the length of bar stock sufficient to provide a gripping surface for the collet type gripping device. This additional length of bar stock extending from the chuck increases the deflection of the bar stock caused by the pressure of the cutting of tools resulting in a loss of accuracy.

The use of pedestal members to support the end of the bar stock for rotation by the chuck during the machining operations is also disclosed by Selby. However, no method of adapting the support members to retain bar stock of different diameters is disclosed.

The present invention is directed to overcoming all of the problems set forth above.

DISCLOSURE OF THE INVENTION

In the present invention an internal bar stock feed apparatus is mounted on a machine tool turret to positively engage the bar stock. Only a short length of bar stock must extend from the chuck of the machine tool to provide a gripping surface for the gripping device. Positive engagement of the bar stock is effected when the turret moves the gripping device transverse to the length of the bar stock to make a pair of shallow notches in diametrically opposed surfaces of the bar stock. The gripping device then engages the notches during movement of the turret in the feed direction to pull the bar stock a predetermined distance through the chuck into the work area. The gripping device is adjustable by simply turning a worm gear to open or close the arms of the gripping device. A passive stock retaining means is provided for supporting the end of the bar stock extending from the feed end of the machine tool for rotation by the chuck. Interchangeable guide elements are retained within the passive stock retaining means to accommodate bar stock of various diameters.

The gripping device of the present invention securely grips the bar stock and accurately advances it a precise distance into the work area. The length of bar stock extending into the work area is kept to a minimum, thus reducing the longitudinal turret travel required to provide clearance to grip the end of the bar stock. In addition, machining accuracy is improved since the cutting operations are performed as close as possible to the chuck. The machine tool according to the present invention is adapted to accommodate bar stock having various diameters by simply adjusting the gripping device and changing the guide block bushings.

BRIEF DESCRIPTION OF THE DRAWINGS

FIG. 1 is an elevation view of an automatic lathe having an internal bar stock feed apparatus.

FIG. 2 is a side view of the engagement end of the gripping device disengaged with the bar and in dashed lines showing the gripping device engaging the bar stock.

FIG. 3 is an elevation view of the gripping device showing it in engagement with the bar stock and in dashed lines showing the device after advancing the bar stock.

FIG. 4 is a side view of the gripping device partially broken away to show the cutting elements and in dashed lines showing the arms of the gripping device spread to engage bar stock having a larger diameter.

FIG. 5 is a plan view of the gripping device.

FIG. 6 is an exploded perspective view of the gripping device.

FIG. 7 is a sectional view of the engagement end of one of the gripping device arms including a compression spring on one side of the cutting element.

FIG. 8 is a perspective view of the guide block.

BEST MODE FOR CARRYING OUT THE INVENTION

Referring to FIG. 1, a machine tool indicated generally by the reference numeral 10 is provided with a universal chuck 12 for holding one end of a length of bar stock 14 for rotation. The machine tool 10 has a work area, generally indicated at 16, in which a tool changing turret 18 is mounted for longitudinal and transverse movement. The other end of the bar stock 14 extends through the chuck 12 away from the work area 16 to a feed region generally indicated at 20. Guide means 22 are located in the feed region 20 to support the other end of the bar stock 14 for rotation by the chuck 12. A gripping device 24 is fixedly mounted on the turret 18 at one of the tool stations 26.

As best seen in FIGS. 5 and 6, the bar stock gripping device 24 of the preferred embodiment includes first and second arms 28 and 30, preferably made of hardened steel, and mounted on the shank portion 31 of a bolt 32 that is fastened to the turret 18. The first and second arms 28 and 30 are adjustably pivotable relative to each other about the bolt 32.

The first arm 28 has a U-shaped engagement end 34 and a pivot end 36. At the engagement end 34 of the first arm 28 a first hardened steel cutting element 38 is rotatably mounted to project from the inner surface 40 of the first arm 28. The engagement end 34 of the first arm 28 is U-shaped having first cutting element 38 mounted on a pin 42 within the U-shaped engagement end 34. The pin 42 is press-fit into a hole 44 in the engagement end 34. The second arm 30 has a U-shaped engagement end 35 and a pivot end 37. At the engagement end 35 second hardened steel cutting element 39 is rotatably mounted on a pin 43 to project from the inner surface 41 of the second arm 30. The engagement end 35 of the second arm 30 is similar to the engagement end 34 of the first arm 28 in that it is U-shaped and has a pin 43 press-fit into a hole 45 through the U-shaped engagement end 35.

First and second cutting elements 38 and 39 are cylindrical in shape and have sharp circumferential ridges 46 and 47 respectively on the outer surfaces thereof. First and second cutting elements 38 and 39 have first and second holes 48 and 49 through their major axis to receive first and second pins 42 and 43. The hardened steel cutting elements 38 and 39 resist wear since the bar stock is generally a softer material. However, when the ridges 46 and 47 become dull the cutting elements 38 and 39 can be easily replaced by removing the pins 42 and 43 and inserting new cutting elements 38 and 39.

In the preferred embodiment the machine tool 10 has a universal chuck 12 for holding the bar stock 14. The device can also be used with a collet chuck in which case a compression spring 50 as shown in FIG. 7 may be mounted on each of the pins 42 and 43. Typically, when a collet engages a work piece a slight advancement or retraction of the work piece occurs. The spring 50 for a retraction type collet is located on the side of each of the cutting elements 38 and 39 closest to the chuck 12 and for an advancement type collet the spring 50 is on the opposite side of each of the cutting elements 38 and 39. Thus, when the collet closes the slight movement of the bar stock, it will not damage the cutting elements 38 and 39.

The pivot end 36 of the first arm 28 includes a substantially circular plate 52 extending from the inner surface 40 of the first arm 28 toward the second arm 30. The plate 52 has a bearing surface 54 on its upper side as viewed in FIG. 6, and has a pivot hole 56 having an axis extending perpendicular to the plate 52. A bore 58 extends from the rear portion 60 of first arm 28 toward the engagement end 34. The bore 58 has an opening 61 intermediate its length on the inner surface 40 of the first arm 28 above the plate 52. A worm gear 59 is disposed within the bore 58 on a pilot pin 63 and is engageable through opening 61. The pin 63 is retained in a hole 67 extending through the first arm 28 and fits into an annular pilot groove 65 in one end of the worm gear 59.

The pivot end 37 of the second arm 30 includes a substantially circular plate 62 extending from the inner surface 41 of the second arm 30 toward the first arm 28. The plate 62 has a bearing surface 64 on its lower side as viewed in FIG. 6, and has a pivot hole 66 with an axis extending perpendicular to the plate 62. Gear teeth 68 are machined in the side of plate 62 abutting the inner surface 40 of the first arm 28. As seen in FIG. 4, the gear teeth 68 are engaged by the worm gear 59 allowing it to be turned to change the distance between first and second engagement ends 34 and 35 of first and second arms 28 and 30.

The distance between first and second cutting elements 38 and 39 must be set so that the annular ridges 46 and 47 when brought into engagement with the bar stock 14 cut two notches 96 into the surface of the bar stock 14. Adjustment of the gripping device 24 is effected by turning the worm gear 59 while the gripping device 24 is in engagement with the bar stock until a pair of shallow notches 96 are formed in the surface of the bar stock 14. After adjustment the gripping device 24 is held in position by worm gear 59 and gear teeth 68 until a different diameter bar stock is to be machined.

As shown in FIG. 5 the bolt 32 passes through pivot holes 56 and 66 in first and second pivot plates 52 and 62, and is secured to a mounting block 70. The bolt 32 has an extended shank portion 31 for receiving first and second arms 28 and 30. In the preferred embodiment the bolt 32 is counter-sunk in a counterbore 72 in the top surface 73 of the pivot plate 62. The mounting block 70 is in turn secured to one of the stations 26 on the machine tool turret 16.

As shown in FIGS. 1 and 8 a guide means, generally indicated at 22, includes two parallel rails 74 extending from the feed end 76 of the machine tool 10 and being supported in spaced parallel relationship by pedestal members 78. A plurality of guide blocks 80 may be mounted on the rails to retain the bar stock 14. The guide blocks 80 each have nylon bushing 82 received within an opening 81. The nylon bushings 82 facilitate free rotation of the bar stock while retaining it in a controlled manner. The nylon bushings 82 are designed to be interchangeable with bushings 82 having different inside diameters, to accommodate bar stock 14 having different outer diameters.

According to the present invention any number of guide blocks 80 can be positioned along the rails 74 to prevent the bar stock 14 from whipping as it is rotated at high speeds by the machine chuck 12. Whipping occurs when unrestrained segments 84 of bar stock 14 begin to gyrate out of control. Positioning additional guide blocks 80 along the rails 74 reduces the length of the unrestrained segments 84 and thereby reduces or eliminates the whipping effect.

The guide blocks 80 are secured to the rails 74 by means of set screws 85 driven through the sides of the guide block 80 to bear upon the rails 74. The nylon bushings 82 are secured within the guide block openings 81 by means of set screws 88 driven through the top of the guide blocks 80 to bear upon the nylon bushings 82, thereby retaining them within the guide blocks 80.

In the preferred embodiment each of the pedestal members 78 include two openings 79 for holding the rails 74, in spaced parallel relationship with clearance in the top of each for the bar stock 14. The pedestal members 78 extend from the rails 74 to the floor, generally indicated at 94 in FIG. 1, and can be anchored to the floor 94.

Industrial Applicability

In operation, the machine tool 10 is loaded with a length of bar stock 14 extending through each of the bushings 82 in the guide blocks 80 and into the chuck 12. The chuck 12 is opened to permit the bar stock 14 to extend through it into the work area 16, far enough to permit the first part (not shown) to be machined. The first and second arms 28 and 30 of the gripping device are brought into engagement with the bar stock by moving the turret 18. The gripping device is then adjusted by turning the worm gear 59 until first and second annular ridges 46 and 47 of first and second cutting elements 38 and 39 make a pair of shallow notches 96 at diametrically opposed locations in the surface of the bar stock 14. The turret 18 is then moved transverse to the feed direction to disengage the gripping device 24 from the bar stock 14. The machine tool 10 is then ready to initiate machining operations. After each part is machined the numerical control of the machine tool 10 initiates the feed cycle.

On the first step of the feed cycle the numerical control instructs the turret 18 to rotate the gripping device to the position nearest the chuck 12. Next, the gripping device 24 is moved parallel to the bar stock 14 until first and second arms 28 and 30 are aligned with a predetermined point on the bar stock 14 as shown in FIG. 2. The gripping device 24 is then moved transverse to the length of said bar stock 14, as indicated by arrow A, to engage the bar stock 14. The bar stock is engaged by first and second cutting elements 38 and 40 which cut into the surface of the bar stock to form a pair of notches 96 therein. After the gripping device 24 has engaged the bar stock 14, the chuck 12, is opened by the numerical control (not shown) and the turret 18 moves a predetermined distance away from the chuck 12, parallel to the length of the bar stock 14, as indicated by arrow B in FIG. 3. The cutting elements 38 and 40 remain disposed in the notches 96, as the stock is pulled through the open chuck 12. When a predetermined amount of bar stock 14 has been pulled into the work area 16, the chuck 12 closes to lock the bar stock 14 in position. In the final step of the feed cycle, the gripping device 24 is disengaged from the bar stock 14 by a transverse movement of the turret 18 away from the bar stock 14. The bar stock 14 is now in position for the commencement of machining operations.

The numerical control circuitry for controlling the sequence of operations during the feed cycle is well known in the art and is disclosed in U.S. Pat. No. 3,703,112 issued to Selby. As each part is completed the bar puller advances the bar stock an additional increment until the bar stock 14 is depleted.

As can be appreciated the apparatus of the present invention is particularly well adapted to be changed to accommodate bar stock 14 of different diameters. The gripping device 24 may be easily adjusted by turning the worm gear 60 to open or close the first and second arms 28 and 30 relative to one another, as shown in FIG. 4. In addition, the bushings 82 in the guide blocks 80 are readily interchanged. The bushing elements 82 of the guide blocks 80 may be changed by simply releasing the set screw 88 and replacing the nylon bushing 82 with a nylon bushing element 82 having an inner diameter corresponding to the new bar stock diameter.

The novel method of gripping the bar stock 14 is particularly advantageous since the notches 96 provide a precisely located secure gripping point on the bar stock 14, thereby preventing slippage due to oil on the surface of the bar stock 14. Since no spring elements are required to grip the bar stock 14 slippage caused by worn spring elements is eliminated. Thus, machining accuracy is improved by the elimination of two sources of feed length variation.

It is to be understood that the invention has been described with reference to a specific embodiment with various modifications being possible and that the foregoing description is not to be construed in a limiting sense.

We claim:

1. In a machine for operating on elongate cylindrical bar stock, the improvement comprising:
    a gripping device having a pair of adjustable, opposing cutting elements spaced apart a distance less than the outer diameter of the bar stock;
    means for moving the gripping device transversely to the longitudinal axis of the bar stock to engage the bar stock from its side, with the cutting elements forming notches therein; and
    means for moving the gripping device parallel to the longitudinal axis of the bar stock to pull the bar stock into a given area for performing work on the bar stock.

2. The improvement of claim 1 wherein said gripping device includes a means for adjusting said first and second cutting elements relative to each other by changing the distance therebetween.

3. The improvement of claim 1 wherein said gripping device includes first and second elongate arms, a pivot element interconnecting said first and second arms at said first end of said gripping device, and means for securing said pivot element to said turret.

4. The improvement of claim 3 wherein said first and second arms are interconnected by an adjustment means for moving the second end of said arms complementally toward and away from each other.

5. The improvement of claim 4 wherein said adjustment means comprises a worm gear disposed within a bore in said first arm, and a plurality of gear teeth disposed on a surface of said second arm for engaging said worm gear.

6. The improvement of claim 3 wherein said first end of the first and second arms includes a pivot plate extending from the interior of each arm toward the other of said arms, said pivot plate having first and second planar surfaces respectively, each of said pivot plates having an opening in the center perpendicular to said planar surfaces; a pivot pin extending through said openings; and means for securing said pivot pin to said turret.

7. The improvement of claim 1 wherein said cutting elements are made of hardened steel.

8. The improvement of claim 7 wherein said cutting elements are cylindrical rollers having a sharp circumferential ridge projecting outwardly from the periphery thereof.

9. The improvement of claim 8 wherein said rollers are retained within a U-shaped opening in the second end of each of said arms, said rollers being journaled on a pin mounted in said U-shaped opening.

10. The improvement of claim 1 wherein a stock guide is provided comprising:
    a pair of elongate rails extending adjacent to one end of said machine tool,
    means supporting said rails in a fixed relation to said machine tool;

a guide member mounted on said rails, said guide member having a guide bore;

a bushing with an opening having inside diameter slightly larger than the outer diameter of the bar stock, said bushing positioned concentrically within said guide bore;

and means for securing said bushing within said guide bore whereby, the bar stock is slideably positioned through the bushing and maintains a fixed position relative to each of the rails while rotating within the opening in said bushing.

11. The improvement of claim 10 wherein said bushing is interchangeable with bushings having openings with different inner diameters.

12. A feed device for positioning elongate bar stock for machining operations in a machine tool having a carriage and a crosslide, means for slideably positioning the carriage and the crosslide along axes which are respectively parallel and perpendicular to the axis of rotation of the bar stock, a multifaced turret, and means for rotatably securing the turret to the crosslide, said feed device comprising:

an elongate member having a first end fixedly secured to said turret;

first and second gripping means disposed in opposed spaced relationship on the second end of said elongate member operative to engaged the surface of said bar stock during transverse movement of the turret, said gripping means being adapted to securely grip the bar stock during longitudinal movement of said turret to slideably position said bar stock through a work area, adjustment means for setting said first and second gripping means in spaced relationship relative to one another.

13. A feed device for positioning elongate bar stock for machining operations in a machine tool having a carriage and a crosslide, means for slideably positioning the carriage and the crosslide along axes which are respectively parallel and perpendicular to the axis of rotation of the bar stock, a multifaced turret, each face of the turret containing a tool or other device for performing machining operations on the bar stock, and means for rotatably securing the turret to the crosslide, said feed device comprising:

an elongate member having a first and second ends, means on said first end for fixedly securing to said turret;

first and second cutting elements disposed in spaced opposed relationship on the second end of said elongate member operative to form diametrically opposed notches in the surface of said bar stock during transverse movement of said turret, said cutting elements means being adapted to securely grip said notches in said bar stock during longitudinal movement of said turret to slideably position said bar stock through a work area.

14. The feed device of claim 13 wherein a means for adjusting said first and second cutting elements relative to each other by changing the distance therebetween is provided.

15. The feed device of claim 14 wherein said elongate member includes first and second elongate arms, a pivot element interconnecting said first and second arms at said first end of said elongate member, and means for securing said pivot element to said turret.

16. The feed device of claim 15 wherein said first and second arms are interconnected by an adjustment means for moving the second end of said arms complementally toward and away from each other.

17. The feed device of claim 16 wherein said adjustment means comprises a worm gear disposed within a bore in said first arm, and a plurality of gear teeth disposed on a surface of said second arm for engaging said worm gear.

18. The feed device of claim 13 wherein said cutting elements are cylindrical rollers made of hardened steel having a sharp circumferential ridge projecting outwardly from a periphery thereof.

19. In a machine tool for operating on bar stock, the machine tool including a carriage and a crosslide means for slideably positioning the carriage and the crosslide along axes which are respectively parallel and perpendicular to the axis of rotation of the bar stock, and a multi-faced turret rotatably secured to the crosslide, each face of the turret containing a tool or other device for performing machining operations on the bar stock, a gripping apparatus fixedly secured to one face of the turret, said gripping apparatus including:

first and second elongate arms, a pivot element interconnecting said first and second elongate arms at the first end of the elongate arms, said pivot element being fixedly secured to one face of the turret;

a cylindrical roller rotatably mounted on the second end of each of the elongate arms, such that the axis of rotation of each of the rollers is parallel to the axis of rotation of the bar stock, each of the rollers having a sharp circumferential ridge projecting outwardly from the peripheries thereof, the rollers being disposed in space opposed relationship to each other, whereby, as the elongate arms are slideably positioned by moving the turret in a direction transverse to the axis of rotation of the bar stock, and as each of the arms surround the bar stock, engaging the bar stock therebetween, the ridges on the cylindrical rollers contact the surface of the bar stock forming notches therein and maintaining a sufficient grip upon the bar stock that the bar stock may be slideably positioned by moving the turret in a direction parallel to the rotational axis of the bar stock.

* * * * *